Oct. 20, 1959  R. H. WADE ET AL  2,909,570
PURIFICATION OF TELOMERS
Filed June 17, 1954
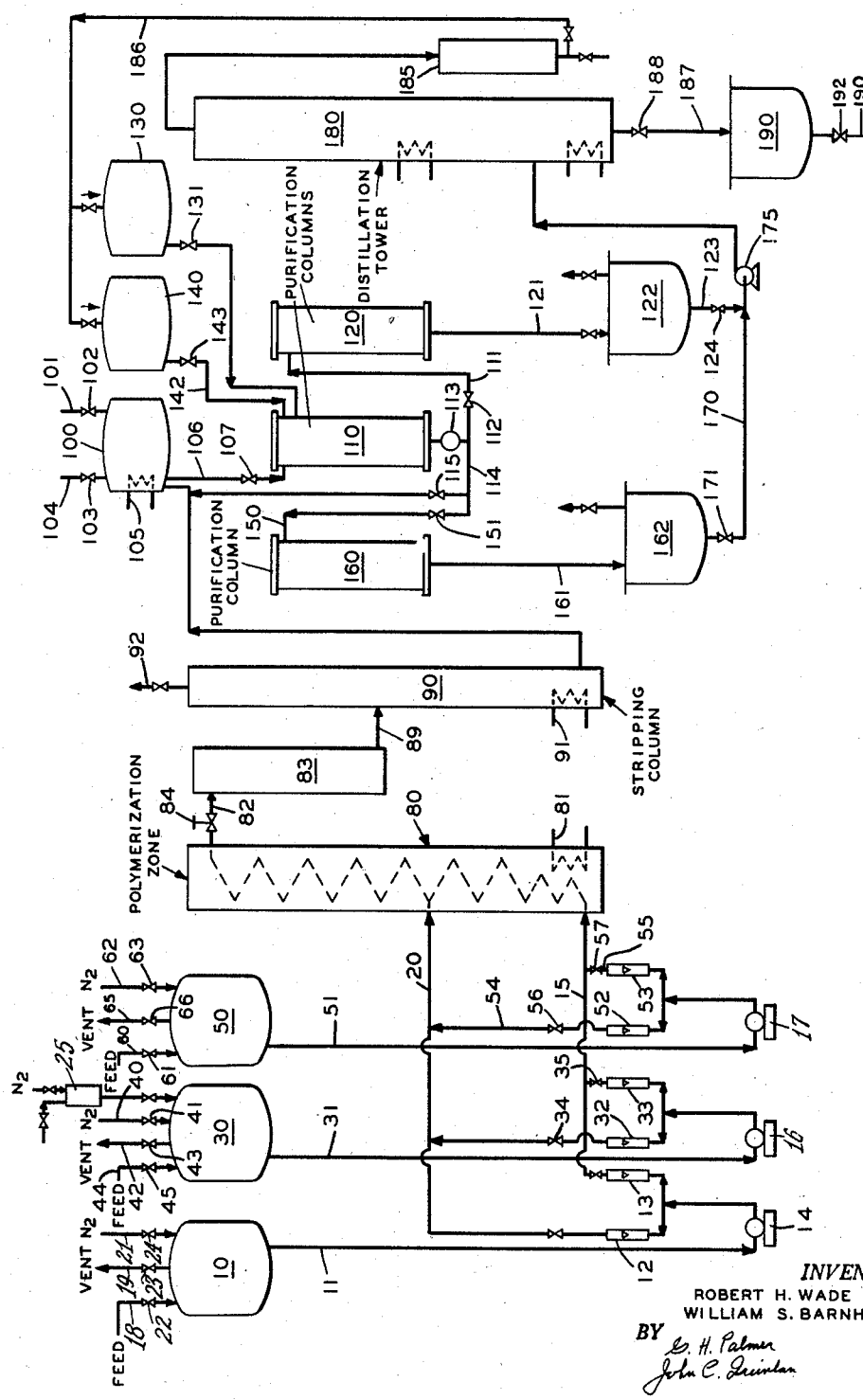
INVENTORS
ROBERT H. WADE
WILLIAM S. BARNHART
BY
G. H. Palmer
John C. Quinlan
ATTORNEYS United States Patent Office 2,909,570
Patented Oct. 20, 1959

2,909,570

PURIFICATION OF TELOMERS

Robert H. Wade, Ridgeview Drive, and William S. Barnhart, Cranford, N.J., assignors, by mesne assignments, to Minnesota Mining and Manufacturing Company, St. Paul, Minn., a corporation of Delaware Application June 17, 1954, Serial No. 437,524

19 Claims. (Cl. 260—653)

This invention relates to low molecular weight halogen containing telomers, their preparation and purification. In one aspect, this invention relates to a method for preparing and purifying liquid, grease and wax-like telomers which contain halogen terminal groups, preferably chlorine. Liquid, grease and wax-like telomers of fluoroethylenic and chlorofluoroethylenic compounds may be used as plasticizers, hydraulic fluid, heat transfer media, lubricants and dielectric fluids.

This application is a continuation-in-part of the prior and copending applications Serial Nos. 294,495, filed June 19, 1952, now Patent No. 2,770,659; 342,743, filed March 16, 1953, now Patent No. 2,837,580; 392,995, filed November 18, 1953, now Patent No. 2,786,827, and 347,186, filed April 6, 1953, of William S. Barnhart wherein detailed description of the methods of preparing telomeric compounds may be found.

For the purposes of this invention, the term "telomer" means both homo-telomers and co-telomers. The term "polymerization" or "telomerization" in their broadest sense include both homo-polymerization and co-polymerization and homo-telomerization and co-telomerization respectively.

Telomerization is usually effected with a catalyst and, with a telogen. The reaction proceeds under properly controlled conditions to produce the desired telomeric product. However, relatively large quantities of impurities formed by the reaction of the catalyst, the telogen and also by side reaction of the monomer, are also produced. The presence of these impurities not only effects the esthetic quality of the product, e.g., color, but in many instances causes serious degradation of the product and of the materials with which the product is used. Several extractive techniques have been developed for removing these impurities. In one procedure, successive washings with methyl alcohol is used. However, in this procedure, the quantity of alcohol necessary to adequately purify the material is excessively high and in addition the efficiency of purification is not good. Extraction with sulfuric acid yields a relatively good product but phase separation is excessively troublesome. Attempts to purify the telomer by distillation were unsuccessful due to co-distillation and the degradative action of the impurities on the telomer product.

It is an object of this invention to provide a process for producing oil, grease and wax-like perfluoroethylenic and perfluorochloroethylenic telomer materials of high purity.

It is another object of this invention to provide a simple, economical and practical method of purifying low molecular weight halogen containing telomers.

Another object of this invention is to provide a process for producing stable oil, grease and wax-like telomeric materials.

Various other objects and advantages will become apparent to those skilled in the art from the accompanying description and disclosure.

The above objects are accomplished by telomerizing the monomer, as described herein, and by contacting the telomeric product, together with associated impurities with activated alumina.

Telomerization occurs essentially as shown below in a typical reaction using chlorotrifluoroethylene and sulfuryl chloride as an example:

$$nCF_2=CFCl + SO_2Cl_2 \rightarrow SO_2 + Cl-(CF_2-CFCl)_n-Cl$$

As shown, sulfur dioxide gas is formed as well as a clear polymeric mass, usually in gel-like form, which includes various grades of telomeric halocarbons, such as liquids, oils, greases and soft waxes. These telomeric halocarbons may be separated by conventional distillation. The distillable substances obtained by telomerizing chlorotrifluoroethylenic compounds in the presence of sulfuryl chloride are sufficiently stable as not to absorb appreciable amounts of fluorine even though exposed to the gas for 24 hours at a temperature of 60° C. or to significantly pyroliticly decompose at temperatures up to 200° C.

The halogen atoms of the sulfuryl halides are selected from the group consisting of fluorine, chlorine and bromine, and mixtures thereof. The preferred telogen, sulfuryl chloride, is usually prepared by the catalytic combination of sulfur dioxide and chlorine gas. Other sulfuryl halides useful in the present invention, include $SO_2F_2$, $SO_2Br_2$, $SO_2FCl$, and $SO_2BrCl$. It is also within the scope of this invention to generate the sulfuryl halide in situ, i.e., by passing into the telomerizing mass a mixture of $SO_2$ and halogen, in the proper stoichiometric quantities, either as liquids or gases or both.

The compounds formed by telomerization in the presence of a sulfuryl halide have the general formulae:

$$W-(X)_n-W$$

wherein W is a member selected from the group consisting of fluorine, chlorine and bromine, X is a haloolefinic, preferably haloethylenic, monomer unit and n is an integer greater than one, preferably at least 4 and preferably not more than 20 and $$W-(X)_n(Y)_m-W$$

wherein W is a member selected from the group consisting of fluorine, chlorine and bromine, X and Y are different haloolefinic, preferably ethylenic, monomer units and n and m are integrals and preferably each is greater than one, and each is not greater than 10.

The present invention is particularly applicable to the purification of telomers of halogenated olefins, preferably fluorine containing olefins, such as are obtained by telomerization of perfluorochloroolefins, such as chlorotrifluoroethylene, perfluoroolefins, such as tetrafluoroethylene, chloroolefins, such as vinyl chloride, and fluoroolefins, such as vinylidene fluoride. The invention also contemplates the purification of telomers obtained by the telomerization of various polymerizable halogenated, preferably fluorinated, olefins; for example, perfluorobutadiene, 2-methyl phenyldifluoroethylene, difluorodichloroethylene, perfluoroacrylonitrile, perfluorostyrene, perfluorocyclobutene, 2-chlorostyrene, 2-chloropropene, vinylidene chloride, vinyl bromide, tetrachloropropene, chlorobutadiene, 2-bromostyrene, bromotrifluoroethylene, unsym. dibromodifluoroethylene, trifluoroethylene, vinyl fluoride, etc. As previously mentioned, the present invention applies to the purification of co-telomers of these monomers, as well as their homo-telomers. For example, the invention applies to the purification of co-telomers of chlorotrifluoroethylene and tetrafluoroethylene. With respect to cotelomers, the second monomer or co-monomer is a halogenated olefin and preferably an olefin in which the halogen is selected from a group consisting of fluorine and chlorine. The monomers may also be co-telomerized with a wide range of compounds which do not readily homo-polymerize or homo-telomerize. For example, the invention contemplates cotelomers of compounds of the nature of sym. dichlorodifluoroethylene and trichloroethylene incorporated with such compounds as chlorotrifluoroethylene and tetrafluoroethylene and the purification of the crude telomeric product.

The crude homo-telomer of trifluorochloroethylene produced by the above outlined technique and by the process described in detail below was analyzed to determine what impurities were present. The impurities were found to be benzoic acid and chlorobenzene which are produced by the decomposition of the catalyst. Dissolved and precipitated iron salts were also identified. These iron salts probably come from the walls of the various reactors and conduits through which the material is passed. Another impurity is p-chloro phenol which probably comes from the hydrolysis of chlorophenyl benzoate. In addition to the above impurities, and others not yet identified, there is a colored material which has thus far not been identified except that infra-red analysis indicates a strong 5.78 micron absorption which is characteristic of a carbonyl compound. The presence of this strongly colored non-polar carbonyl compound is of use in the purification process since being non-polar it will not be retained by spent alumina. The fact that the alumina is spent may, therefore, be detected by observing color in the telomer. Other means of detection may be used. For example, benzoic acid being polar would cause a change in the conductivity of the telomer which could be detected by electrical measuring devices. For example, tests were made in a 25 ml. Balsbaugh Cell (No. 2TN25) with a Sticht 20 million megohmmeter using 500 volts D.C. White telomer (colorless) had a resistance of $5-10 \times 10^6$ megohms. Light yellow telomer had a resistance of $4-6 \times 10^2$ megohms. While the specific resistances will vary depending on the constants of the test equipment employed, the relative difference in resistance between pure and colored telomer is such that electrical detection means can be employed. However, the color detection technique is preferred, since it is less expensive, less subject to failure and since the colored contaminant is the first impurity which is not sorbed by spent alumina. It should further be noted that this colored material is not degradative but merely effects the color of the polymer.

The particle size of the alumina is of considerable importance. If the particle size is too coarse, purification efficiency is drastically reduced; if too fine, the telomer will not flow through the column. Particle size should be adjusted so that 100 percent passes through a number 8 sieve and not more than 20 percent passes through a number 200 sieve. Preferably the coarsest particle size which is used is 100 percent through number 8 sieve retained on a number 48 sieve, while the finest particle size is 100 percent through a number 80 sieve retained on a number 200 sieve. The selected particle size of the alumina, within the above limits, is based on the grade of telomer being produced. A fine particle size is used where predominantly oily telomer is being purified whereas when waxes are prepared a coarse particle size is used. In most applications, a particle size which passes a number 50 sieve and is retained on a number 100 sieve will be adequate.

Because it normally would be expected that the telomer product might react with alumina, particularly at elevated temperatures, to produce aluminum derivatives of the telomer, analyses of purified telomer product were made. These analyses indicate that no reaction took place.

Several attempts were made to use absorptive materials other than alumina in the purification process of this invention, these materials were found to be inadequate. Silica-gel was tried and while it improved the color of the material it did not remove degradative impurities. Activated carbon in various particle sizes was also tried. In the large particle size excessive quantities of activated carbon were required, and the degree of purification was not satisfactory. When activated carbon of small particle size was employed, the carbon was carried through with the polymer to produce a gray colored material which could not be clarified except by using relatively cumbersome techniques. Alumina therefore is the preferred sorptive media although silica-gel and activated carbon may be used in conjunction with an alumina treatment.

In order to more clearly illustrate the invention, reference will be made to the drawing which diagrammatically presents in elevation a process for continuously producing and purifying telomeric materials. For convenience, this process will be described with reference to the production of a homo-telomer of trifluorochloroethylene. Catalysts which can be used in the reaction are the aromatic peroxides, such as benzoyl peroxide, chlorinated aromatic peroxides such as dichlorobenzoyl peroxide, aliphatic peroxides, such as di-t-butyl peroxide, chlorinated aliphatic peroxides such as trichloroacetyl peroxide and metal compounds such as tetraethyl lead. Suitable solvents include 1,2,2, trifluorotrichloroethane, tetrachloroethylene, carbon tetrachloride, tetrachloroethane and methylene chloride. In the process described, sulfuryl chloride is used as telogen, benzoyl peroxide is the catalyst and methylene chloride is the catalyst solvent.

Monomeric trifluorochloroethylene is continuously fed from feed tank 10 through conduit 11 to rotometers 12 and 13. Feed tank 10 is filled through conduit 18, vented through conduit 19 and maintained under nitrogen pressure through conduit 21. Valves 22, 23 and 24 are used to control the conduits. Pump 14 (a Lapp Pulsafeeder) is used to achieve the desired flow. The monomer may be introduced at several points in the polymerization zone 50. As shown in Figure 1 of the drawing which for purposes of clarity illustrates the introduction at two points in the polymerization zone, the rate of flow of monomer is controlled by rotometers 12 and 13, such that monomer is fed to the lower portion of polymerization zone 50 through conduit 15 and to a middle portion of polymerization zone 50 through conduit 20.

The telogen, sulfuryl chloride, containing a small quantity of sulfur dioxide, is fed from feed tank 30 through conduit 31 to rotometers 32 and 33. Pump 16 (a Lapp Pulsafeeder) is used to achieve flow. Rotometers 32 and 33 are connected to conduits 15 and 20 so that the telogen is also introduced at various points in the polymerization zone under controlled conditions. Valves 34 and 35 are used in conjunction with the rotometers to control the distribution of telogen. Feed tank 30 is maintained under nitrogen pressure by means of conduit 40 and valve 41. Provision for venting is provided by conduit 42 and valve 43. Telogen is added as required through conduit 44 by opening valve 45. Sulfur dioxide contained in feed tank 25 is introduced, as required, into feed tank 30 through conduit 46. Tank 25 is also pressurized with nitrogen.

The catalyst benzoyl peroxide dissolved in methylene chloride, is fed from feed tank 50 through conduit 51 to rotometers 52 and 53. The stream from rotometer 52 flows through conduit 54 to conduit 20. The stream from rotometer 53 flows through conduit 55 to conduit 15. Valves 56 and 57 control the distribution of dissolved catalyst. Feed tank 50 is filled through conduit 60 by opening valve 61. Nitrogen pressure is maintained through conduit 62 and valve 63. Feed tank 50 is vented through conduit 65 and valve 66.

The proportion of reactants introduced into polymerization zone 80 is determined by the quantity and grade of telomeric product that is desired. By varying the concentration reactants predominantly wax-like material or predominantly oil-like material is prepared. Generally, for the particular equipment herein described, the flow of monomer to polymerization zone 80 is between about 1 and about 4 gallons per hour. The flow of sulfuryl chloride is between about 0.5 and about 2 gallons per hour. The flow of catalyst solvent is between about 0.2 and about 0.8 gallons per hour. The concentration of catalyst in the solvent is between about 0.75 and about 2 pounds per gallon of solvent. As indicated previously, by proper selection of feed rates predominantly wax-like and oil-like materials are prepared. Thus, by operating with high concentrations of sulfuryl chloride and low concentrations of monomer predominantly oil-like or low boiling material is prepared.

In the process described herein, polymerization zone 80 comprises a Monel (schedule 40) pipe approximately between about 0.5 and 2 inches inside diameter and between about 200 feet and 400 feet in length arranged preferably in the form of a coil. The coil is contained in a water bath which is maintained at a temperature suitable to the telomerization reaction by means of heater 81. Heater 81 may be any suitable heating means, such as low pressure steam or electric heating units. Electric heaters are preferred.

Depending on the type of telomeric product desired, i.e., predominantly oil or wax and depending on the particular catalyst which is employed, temperature in the polymerization zone can vary between about 25° C. and about 150° C. preferably between about 75° C. and about 100° C. Temperature is controlled by thermostats or by reducing the pressure in the vessel which contains water. Pressure is maintained at between about 300 and about 400 p.s.i.g. at the exit end of the polymerization coil.

Residence time in the coil may vary between about 1 and about 6 hours depending on the quantity and grade of material which is desired, preferably between about 2 and about 4 hours.

The crude telomeric effluent is passed from polymerization zone 80 through conduit 82 to temperature control zone 83. Valve 84 regulates back pressure. Temperature control zone 83 is used to heat or cool the crude telomeric effluent prior to its introduction into stripping column 90. The telomeric effluent is introduced into stripping column 90 through conduit 89 at a temperature midway between the temperature at the bottom and at the top of stripping column 90. The bottom of stripping column 90 is maintained at a temperature between about 205° C. and about 215° C. while the top is maintained between about 120° C. and about 132° C. The temperature in stripping column 90 is maintained by means of electrical heaters 91 which are thermostatically controlled. Additional heaters either steam or electrical are positioned along the column to insure more accurate control of temperature in the column.

Low boiling impurities such as sulfuryl chloride, sulfur dioxide and small quantities of methylene chloride and Freon 113 are stripped from the top of stripping tower 90 through conduit 92. This effluent is condensed and may be recovered and purified. The crude telomeric residue, free of the above described low boiling impurities but still containing highly degradative impurities is then withdrawn from the bottom of stripping column 90 and transferred through conduit 95 to crude telomer hold tank 100. Hold tank 100 is maintained under nitrogen pressure by conduit 101 and valve 102 and is vented by opening valve 103 on conduit 104. The crude telomer is maintained at an elevated temperature, for reasons which will be described hereinbelow, by means of electrical heater 105. The crude telomer is passed from hold tank 100 to the upper portion of purification column 110 through conduit 106. Valve 107 is used to shut down the column for cleaning purposes.

Purification column 110 is a carbon steel cylinder between 4 feet and 10 feet in height and between 2 and 12 inches in diameter and is fitted with removable tops and bottoms. The purification column contains between about 50 and 200 pounds of the purification agent alumina. The column is packed first with glass wool at the bottom after which the alumina is added. The column is tapped so as to pack the column after which an additional wadding of glass wool is placed on top of the column. The size of the column may be larger or smaller and may contain more or less alumina depending principally on the output of polymerization zone 80. The column herein described is optimum for the particular quantity of telomer being prepared.

As indicated previously, the crude telomer is introduced into the upper portion of column 110 through conduit 106 at an elevated temperature. Elevated temperatures are used because the flow through the column is more readily achieved and because elevated temperatures increase the purification efficiency of the column. The telomer, is maintained at a temperature between about 50° C. and 150° C. preferably between 90° C. and 110° C. The telomer may be allowed to flow through the column by gravity or the column may be maintained at an elevated pressure by use of nitrogen. When used, nitrogen pressure should not exceed 50 p.s.i.g. Flow rate through the column is maintained between ¼ and 10 gallons per hour, preferably between 1 and 5 gallons per hour. The effluent from the bottom of purification tower 110 is passed through conduit 111 to the upper portion of purification column 120 which is identical with column 110. Valve 112 is used to stop the flow to the top of column 120 for reasons which will be made clear hereinbelow. Detector 113 is positioned on conduit 111 and is used to detect the break-through of impurities which occurs after the alumina has become spent. Visual means are preferred since the first impurity to break through is colored. However, conductivity measurements may also be used to detect breakthrough of impurities. When the column is spent it is removed from the line and the flow of telomer is directed to the top of tower 120 by means not shown. In practice three columns or more are used for this operation, although only two are shown. The others are on standby. When the first column breaks down the second column which was in series with the first becomes the first column and the standby column is placed in series. Conduits and valves which are used to connect these columns, and change their relative positions in the line, have been omitted for purposes of clarity.

When it has been determined that the purification column for example, column 110 is spent, the column is taken out of service and is cleaned by the following procedure. First low boiling telomer oil, i.e., telomer oil which boils below 95° C. at 1.0 mm. is introduced to the top of column 110 from tank 130 through conduit 132 by opening valve 131. The low boiling telomer oil washes most of the sorbed telomer from the column together with dissolved impurities and the elutriated telomer product and the low boiling telomer oil is transferred to crude telomer tank 100 through conduit 114 by closing valve 112 and opening valve 115. The column is then blown with nitrogen to force low boiling telomer to tank 100. After the low boiling telomer wash valve 131 is closed and Freon 113 (1,2,2-trifluorotrichloro-ethane) is added to the top of column 110 from tank 140 through conduit 142 by opening valve 143. The Freon 113 wash liquid is removed from the bottom of column 110 through conduit 144 and 150 by closing valve 115 and opening valve 151 and introduced to the top of purification column 160 which is identical with columns 110 and 120 but which is only used to purify the Freon 113 wash. After column 110 has been washed, Freon 113 is blown down with nitrogen then opened. The spent alumina is removed and the column is repacked as described above and is put on standby. The Freon 113 containing telomer is transferred from the bottom of column 160 through conduit 161 to hold tank 162.

Hold tanks 122 and 162 contain pure telomer product. Hold tank 122 contains small quantities of low boiling telomer, i.e., below 95° C. at 1 mm. formed during the telomerization reaction while hold tank 162 additionally contains added Freon 113. The contents of hold tank 162 is transferred to conduit 170. The contents of hold tank 122 are transferred through conduit 123 by opening valve 124 to conduit 170. Purified telomer product containing low boiling telomer and Freon 113 are pumped from conduit 170 by means of pump 175 to the bottom of distillation tower 180. Distillation tower 180 is provided with an evacuator (not shown) which permits operation at reduced pressure. The effluent from conduit 170 is first flash-distilled at a temperature of about 90° C. to remove Freon 113 overhead. The Freon 113 is condensed, collected in hold tank 185 and is recycled to tank 140 through conduit 186. After the removal of Freon 113, distillation tower 180 is evacuated to about 1 mm. and low boiling telomer, i.e., boiling below 95° C. at 1 mm. is removed overhead, condensed, collected in tank 185, and recycled to tank 130. Pure telomer product boiling above 95° C. at 1 mm. is withdrawn from the bottom of distillation column 180 through conduit 187 by opening valve 188 and is collected in storage tank 190. The material in storage tank 190 may be used as plasticizer for perfluorochloroolefin polymers, such as polytrifluorochloroethylene or may be additionally broken down into narrow distilling fractions, i.e., oil, greases and waxes for other special uses. The pure telomer is removed from tank 190 through conduit 191 by opening valve 192.

As a specific example of the process described herein, 1.8 gallons per hour of trifluorochloroethylene, 0.9 gallons per hour of sulfuryl chloride containing 48 grams of sulfur dioxide per gallon of sulfuryl chloride and 0.4 gallons per hour of methylene chloride containing 1.25 pounds of benzoyl peroxide per gallon of methylene chloride was introduced into polymerization zone 80. In this specific example, total monomer and sulfuryl chloride were introduced into the bottom of polymerization zone 80 through conduit 15. Approximately 75 percent of the above described catalyst solution was introduced into polymerization zone 80 through conduit 15 while the remaining catalyst solution, approximately 25 percent, was introduced midway in the reaction zone through conduit 20.

Polymerization zone 80 was a Monel (schedule 40) pipe approximately 377 feet in length and approximately 1 inch inside diameter arranged in the form of a coil and contained in a jacketed water bath. The polymerization zone was maintained at a temperature of about 100° C. and a pressure of about 350 pounds per square inch gauge at the exit end of the coil. Residence time was approximately 4 hours. Conversion was approximately 95 percent. Plasticizer grade material was prepared.

The effluent from the polymerization zone was heated to a temperature about 150° C. in temperature control zone 83 and was introduced into stripping column 90. The bottom of stripping column 90 was maintained at a temperature of approximately 205° C and the top was maintained at a temperature of about 130° C.

The crude telomer free of low boiling impurities but still containing high boiling degradative impurities was transferred to hold tank 100. The crude telomer was maintained at a temperature of about 100° C. in hold tank 100 and was introduced into the upper portion of purification column 110. Purification column 110 was a carbon steel container approximately 8 feet high and approximately 9 inches inside diameter. The column was packed with 110 pounds of alumina (Alcoa Grade F-20) by the process described above. The flow of telomer through the column was approximately 2 gallons per hour under a nitrogen pressure of approximately 10 pounds per square inch gauge. The effluent from the bottom of purification tower 110 was passed through conduit 11 to the upper portion of purification column 120. Breakdown of the alumina was detected visually through look box 113. When column 110 was spent, it was washed with low boiling telomer oil and with Freon 113 as described above. The pure telomer product together with added low boiling telomer oil and Freon 113 were distilled in distillation tower 180 to remove Freon 113 and low boiling telomer oil. The telomer thus produced, was retained for use as plasticizer.

The above description represents one specific embodiment of the process of this invention, although alterations in procedure can be made without departing from the scope of this invention. For example, the crude telomer effluent from stripping tower 90 may be introduced directly into the top of purification column 110. Further, the purification columns may be used singly rather than in series as described. Various solvents may be used to replace Freon 113 and also the low boiling telomer wash. Thus, methylene chloride, chloroform, carbon tetrachloride, etc. may be used to wash the alumina column.

In another embodiment of this invention, crude telomer was transferred from conduit 62 to a large tank provided with means for mechanical agitation. The crude telomer product was slurried batch-wise with about one-fourth its weight of alumina. The alumina telomer admixture was then filtered and the telomer was again slurried with about one-fourth its weight of alumina and again re-filtered. This type of treatment with alumina provides purer product than material which is obtained by other processes, but it is not preferred over the superior column technique described above since more alumina is needed than with a column technique, and the filtering processes are more difficult to handle. However, in some instances, particularly in a batch type of operation the slurry technique might be preferred, and its use is contemplated. When the slurry technique is used, the telomer is admixed with less than its weight of alumina, preferably not more than one-third of its weight of alumina. The admixture is agitated, filtered and the filtered telomer is again admixed with not more than one-third its weight of alumina if necessary (as detected by color or conductivity measurement) and refiltered. In the slurry type of operation the total alumina used should not exceed 75 weight percent based on telomer preferably not more than 60 weight percent because of the sorption of telomer on alumina. The spent alumina is washed with solvent to recover sorbed telomer which is retreated with alumina.

The purification of other oil, grease and wax-like polymers prepared without the use of a telogen may be effected by the process of this invention and its use in this respect is also contemplated.

Various modifications and alterations of the process of this invention will become apparent to those skilled in the art without departing from the scope of this invention.

Having thus described our invention, we claim:

1. A process for purifying a halogen containing telomer obtained by the telomerization of a halogenated olefin in a metal reactor in the presence of a peroxide promoter which comprises contacting said telomer together with associated impurities with activated alumina and withdrawing said telomer free of impurities from contact with said alumina.

2. A process for purifying a halogen containing telomer obtained by the telomerization of a halogenated olefin in a metal reactor in the presence of a peroxide promoter which comprises contacting said telomer together with associated impurities with activated alumina at a temperature between about 50° C. and about 150° C. and withdrawing said telomer free of impurities from contact with said alumina.

3. The process of claim 2 wherein the halogen containing telomer is a telomer of trifluorochloroethylene.

4. The process of claim 2 wherein the halogen containing telomer is a telomer of tetrafluoroethylene.

5. The process of claim 2 wherein the halogen containing telomer is a telomer of perfluorobutadiene.

6. The process of claim 2 wherein the halogen containing telomer is a telomer of vinylidene fluoride.

7. The process of claim 2 wherein the halogen containing telomer is a telomer of difluorodichloroethylene.

8. A process for purifying a halogen containing telomer obtained by the telomerization of a halogenated olefin in a metal reactor in the presence of a peroxide promoter which comprises admixing said telomer together with associated impurities with not more than about 75 weight percent of activated alumina based on telomer maintaining the resulting admixture at a temperature between about 50° C. and about 150° C. and separating said telomer free of impurities from the admixture.

9. A process for purifying a halogen containing telomer obtained by the telomerization of a halogenated olefin in a metal reactor in the presence of a peroxide promoter which comprises admixing said telomer together with associated impurities with not more than about 60 weight percent of alumina based on telomer maintaining the resulting admixture at a temperature between about 50° C. and about 150° C. and separating said telomer free of impurities from the admixture.

10. A process for purifying a halogen containing telomer obtained by the telomerization of a halogenated olefin in a metal reactor in the presence of a peroxide promoter which comprises introducing said telomer together with associated impurities into a purification zone maintained at a temperature between about 50° C. and about 150° C. flowing said telomer through said purification zone in the presence of activated alumina and removing from said purification zone a telomer product free of associated impurities.

11. A process for purifying a halogen containing telomer obtained by the telomerization of a halogenated olefin in a metal reactor in the presence of a peroxide promoter which comprises introducing said telomer together with associated impurities into the upper portion of a purification zone maintained at a temperature between about 50° C. and about 150° C. flowing said telomer downwardly through said purification zone in the presence of activated alumina and removing from the bottom portion of said purification zone a telomer product free of associated impurities.

12. A process for purifying a halogen containing telomer obtained by the telomerization of a halogenated olefin in a metal reactor in the presence of a peroxide promoter which comprises introducing said telomer together with associated impurities into the upper portion of a purification zone maintained at a temperature between about 50° C. and 150° C., flowing said telomer downwardly through said purification zone in the presence of activated alumina at a pressure not greater than 50 pounds per square inch gauge and removing from the bottom portion of said purification zone a telomer product free of associated impurities.

13. A process for purifying a telomer of trifluorochloroethylene obtained by the telomerization of trifluorochloroethylene in a metal reactor in the presence of a peroxide polymerization promoter which comprises contacting said telomer together with associated impurities with activated alumina and withdrawing said telomer free of impurities from contact with said alumina.

14. A process for purifying a telomer of trifluorochloroethylene obtained by the telomerization of trifluorochloroethylene in a metal reactor in the presence of a peroxide polymerization promoter which comprises admixing said telomer together with associated impurities with not more than 60 weight percent of activated alumina based on telomer maintaining the resulting admixture at a temperature between about 50° C. and 150° C. and separating said telomer free of impurities from the admixture.

15. A process for purifying a telomer of trifluorochloroethylene obtained by the telomerization of trifluorochloroethylene in a metal reactor in the presence of a peroxide polymerization promoter which comprises admixing said telomer together with associated impurities with not more than 60 weight percent of activated alumina based on telomer maintaining the resulting admixture at a temperature between about 90° C. and 110° C. and separating said telomer free of impurities from the admixture.

16. A process for purifying a telomer of trifluorochloroethylene obtained by the telomerization of trifluorochloroethylene in a metal reactor in the presence of a peroxide polymerization promoter which comprises introducing said telomer together with associated impurities into a purification zone maintained at a temperature between about 50° C. and about 150° C. flowing said telomer through said purification zone in the presence of activated alumina and removing from said purification zone a telomer product free of associated impurities.

17. A process for purifying a telomer of trifluorochloroethylene obtained by the telomerization of trifluorochloroethylene in a metal reactor in the presence of a peroxide polymerization promoter which comprises introducing said telomer together with associated impurities into the upper portion of a purification zone maintained at a temperature between about 50° C. and about 150° C. flowing said telomer downwardly through said purification zone in the presence of activated alumina and removing from the bottom portion of said purification zone a telomer product free of associated impurities.

18. A process for purifying a telomer of trifluorochloroethylene obtained by the telomerization of trifluorochloroethylene in a metal reactor in the presence of a peroxide polymerization promoter which comprises introducing said telomer together with associated impurities into the upper portion of a purification zone maintained at a temperature between about 50° C. and 150° C., flowing said telomer downwardly through said purification zone in the presence of activated alumina at a pressure not greater than 50 pounds per square inch gauge and removing from the bottom portion of said purification zone a telomer product free of associated impurities.

19. A process for purifying a telomer of trifluorochloroethylene obtained by the telomerization of trifluorochloroethylene in a metal reactor in the presence of a peroxide polymerization promoter which comprises introducing said telomer together with associated impurities into the upper portion of a purification zone maintained at a temperature between about 90° C. and 110° C., flowing said telomer downwardly through said purification zone in the presence of activated alumina at a pressure not greater than 50 pounds per square inch gauge and removing from the bottom portion of said purification zone a telomer product free of associated impurities.

References Cited in the file of this patent
UNITED STATES PATENTS

| | | |
|---|---|---|
| 1,072,034 | Richter | Sept. 2, 1913 |
| 1,072,035 | Richter | Sept. 2, 1913 |
| 1,994,302 | Clark | Mar. 12, 1935 |
| 2,411,158 | Hanford | Nov. 19, 1946 |
| 2,411,159 | Hanford | Nov. 19, 1946 |
| 2,436,135 | Barrick | Feb. 17, 1948 |
| 2,524,414 | Wolfrom et al. | Oct. 3, 1950 |
| 2,664,202 | Bartleson | Dec. 29, 1953 |
| 2,695,321 | Cines | Nov. 23, 1954 |

OTHER REFERENCES

Cassidy: "Adsorption and Chromatography," New York, Interscience 1951, pages 136, 137, 144, 145, 187 and 189.